(12) United States Patent
Fuchs et al.

(10) Patent No.: US 8,424,100 B2
(45) Date of Patent: Apr. 16, 2013

(54) SYSTEM AND METHOD OF VETTING DATA

(75) Inventors: Kenneth C. Fuchs, Winfield, IL (US); Brian W. Pruss, Streamwood, IL (US); Gary W. Schluckbier, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 520 days.

(21) Appl. No.: 12/748,645

(22) Filed: Mar. 29, 2010

(65) Prior Publication Data

US 2011/0239308 A1    Sep. 29, 2011

(51) Int. Cl.
*G06F 7/04* (2006.01)

(52) U.S. Cl.
USPC ............................................................ 726/26

(58) Field of Classification Search ............ 726/26, 726/30; 713/164, 193; 714/E11.054
See application file for complete search history.

(56) References Cited

U.S. PATENT DOCUMENTS

| | | | | |
|---|---|---|---|---|
| 4,574,350 | A | * | 3/1986 | Starr ............................. 710/200 |
| 5,161,227 | A | * | 11/1992 | Dias et al. ...................... 718/104 |
| 6,219,420 | B1 | | 4/2001 | Hardy et al. |
| 6,546,443 | B1 | * | 4/2003 | Kakivaya et al. ............. 710/200 |
| 7,475,257 | B2 | | 1/2009 | Aguilar, Jr. et al. |
| 2005/0021944 | A1 | | 1/2005 | Craft et al. |
| 2005/0072651 | A1 | | 4/2005 | Wieth et al. |
| 2008/0235510 | A1 | | 9/2008 | Wolf |
| 2008/0235519 | A1 | | 9/2008 | Onouchi et al. |

FOREIGN PATENT DOCUMENTS

EP    0094841 A2    11/1983

OTHER PUBLICATIONS

PCT International Search Report Dated Jun. 8, 2011.
Tannenbaum, A S, "Modern Operating Systems, Passage", Jan. 1, 1992, Englewood Cliffs, Prentice Hall, USA, pp. 33-61; XP002391725.
Mikolajczak B., et al. "Workflow Modeling and Diagnosis With Petri Nets—A Case Study of a Manufacturing Process"; IEEE 2002 International Conference on Systems, Man and Cybernetics (SMC'02). Yasmine, Hammamet, Tunesia; Oct. 6-9, 2002, New York, NY; pp. 372-377; ISBN: 978-0-7803-7437-9.
Lu, D.J. "Watchdog Processors and Structural Integrity Checking"; IEEE Transactions on Computers, IEEE Service Center, Los Angeles, CA, vol. C-31, No. 7, Jul. 1, 1982, pp. 681-685; XP000748217; ISSN: 0018-9340.

* cited by examiner

*Primary Examiner* — Samson Lemma
(74) *Attorney, Agent, or Firm* — Valerie M. Davis; Kenneth A. Haas

(57) ABSTRACT

Systems and methods for vetting data include receiving a notification at a second processor that a first processor has written first output data to an output data buffer in an output device. A hardware-implemented buffer access flag controls a permission for the first processor to write data to the output data buffer. The second processor sets the hardware-implemented buffer access flag to a first setting that prevents the first processor from writing additional output data to the output data buffer while the first output data in the output data buffer is being inspected. The second processor has a read-write permission to the hardware-implemented buffer access flag. The first processor has a read-only permission to the hardware-implemented buffer access flag.

15 Claims, 3 Drawing Sheets

SYSTEM AND METHOD OF VETTING DATA

TECHNICAL FIELD

The present disclosure relates generally to communication systems and in particular to a system and method of vetting data.

BACKGROUND

An ever-increasing number of networked users communicate with each other over peer-to-peer user datagram protocol (UDP)/internet protocol (IP) connections as described in Internet Engineering Task Force Request for Comments (IETF RFC) dated August 1980 and any subsequent revisions, and as described in IETF RFC 791 dated September 1981 and any subsequent revisions. As a result, the use of and demand for transmitting information, such as voice, video, and alphanumeric or symbolic text, among the various interconnected networks has significantly expanded. In addition, the introduction of large bandwidth or "broadband" networks has enabled "real-time" communication with many users over network connections as well as provides nearly ubiquitous access to vast amounts of data at any time. Some examples of broadband-based real-time communication include audio/video conferencing, Voice over Internet Protocol (VoIP), and instant messaging, among others. It should be noted that, as used herein, the terms "data", "data packet", "packet", and "packet data" refer to any combination of voice, video, and alphanumeric or symbolic text. Moreover, "real-time" communication refers to communication exchanged between networked users with negligible latency.

Specifically, however, some transmitted data includes sensitive information that requires restrictive access to only those users authorized to receive the information. For example, personal identification numbers, social security numbers, financial statements, or other personal information should be safeguarded against fraudulent or nefarious acts predicated on accessing such information. In like manner, network security is vital to institutions such as corporations, financial entities, intelligence, military, law enforcement and public safety agencies as well as other government agencies.

End-to-end protection of data or "encryption" is one manner for providing security to a network. Illustratively, encrypted data or "ciphertext" is transmitted over the network to a receiver for decryption by way of an appropriate decryption key. As used herein, non-encrypted data is generally referred to as "plaintext" or "cleartext". In some cases, data encryption is accomplished with one or more software algorithms. In other instances, dedicated hardware data encryption components are implemented. With that said, however, the ciphertext that is sent out by an encryption system might also include non-ciphertext data, for example, due to errors in the encryption algorithms and/or inefficiency in the encryption hardware. Further, to secure data at a "high-assurance" level, the data should be vetted by independent hardware prior to being sent out by the system.

Accordingly, there is a need for a system and method of vetting data.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

Figure 1:
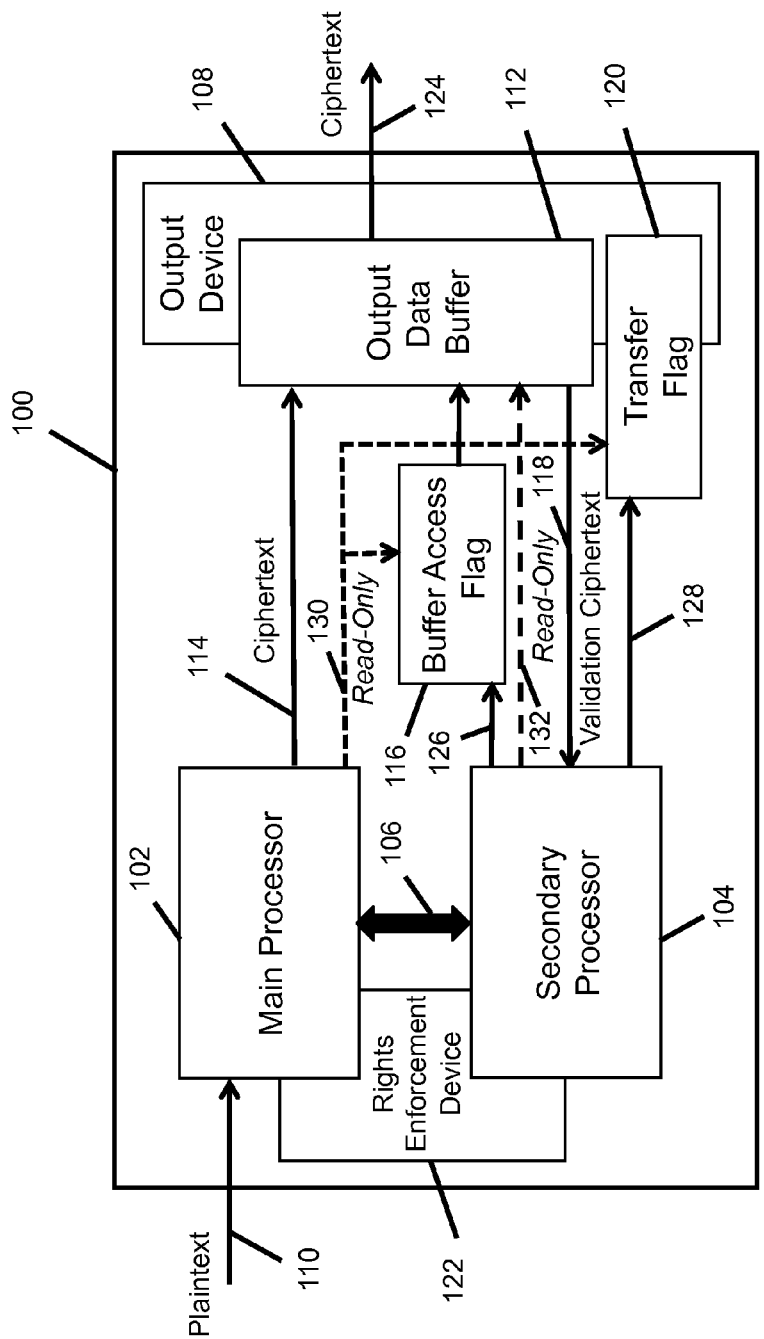
FIG. 1 illustrates a system for implementing a method of vetting data in accordance with one illustrative embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a system and method of vetting data in a data encryption system. Illustrative embodiments of the present disclosure, as described below, provide for confirming that such transmission-pending ciphertext is accurate and not corrupt prior to transmission. Alternatively, other embodiments are applicable to systems and methods that do not require encryption. Further, certain advantages of the methods as described herein, are beneficial to high-assurance encryption networks and systems operating on a broadband network.

Accordingly, methods for vetting data include a second processor receiving a notification that a first processor has written first output data to an output data buffer in an output device. A hardware-implemented buffer access flag designates a permission for the first processor to write data to the output data buffer. The second processor sets the hardware-implemented buffer access flag to a first setting. The buffer access flag in the first setting prevents the first processor from writing additional output data to the output data buffer while the first output data in the output data buffer is being inspected by the second processor. The second processor is exclusively granted a read-write permission to the hardware-implemented buffer access flag. The first processor is granted a read-only permission to the hardware-implemented buffer access flag. As used herein, the term "read-only permission" generally refers to an ability to read, but not modify, a hardware or processor register or other memory device, a system file or directory. In contrast, the term "read-write permission" generally refers to an ability to read and modify a hardware or processor register or other memory device, a system file or directory.

A dedicated hardware-based rights enforcement device, as discussed below, enforces the permissions granted to each of the first and the second processors. In some embodiments, the hardware-based rights enforcement device is referred to as a "bus monitor". In particular, the rights enforcement device ensures compliance with the access rights granted to each of the first and second processors for individual system elements. Accordingly, a method for managing access rights in a data encryption system is as follows. With respect to a rights enforcement device coupled to the first processor and the second processor, the rights enforcement device monitors access of the first processor and the second processor to the hardware-implemented buffer access flag. The rights enforcement device performs a hardware-based enforcement of the read-write permission of the second processor to the hardware-implemented buffer access flag. In addition, the rights enforcement device performs a hardware-based enforcement of the read-only permission of the first processor to the hardware-implemented buffer access flag.

A system for vetting data as disclosed herein comprises an output device that includes an output data buffer, a first processor and a second processor coupled to the output data buffer, and a hardware-implemented buffer access flag coupled to each of the first and second processors and to the output device. The first processor writes output data to the output data buffer and notifies the second processor that the output data has been written to the output data buffer. The hardware-implemented buffer access flag grants access to the first processor to write the output data to the output data buffer. The second processor has a permission to set the hardware-implemented buffer access flag and the first processor has a read-only permission to the hardware-implemented buffer access flag.

The teachings herein are implemented in systems that employ technologies including, but not limited to, those described in various protocols as described below. Illustratively, embodiments of the present disclosure are implemented in systems and networks that provide end-to-end protection of data transmitted over peer-to-peer user datagram protocol (UDP)/internet protocol (IP) connections as described in IETF RFC 768 dated August 1980 and any subsequent revisions, and as described in IETF RFC 791 dated September 1981 and any subsequent revisions. In some embodiments, the data includes IP data packets or Real-Time Transport Protocol (RTP) packets, as described, for example, in Request for Comments (RFC) 3550 dated July 2003 by Internet Engineering Task Force (IETF) and any subsequent revisions. Additionally, in some embodiments, the networks include IP-based Radio Access Networks (IP-based RANs), local area network (LAN)/wide area networks (WAN) Enterprise or IP Multimedia Subsystem (IMS) environments, as described in 3GPP Technical Specification (TS) 23.228 and any subsequent revisions. Further, the networks feature any combination of network connectivity devices as described below with reference to FIG. 1. These network connectivity devices enable communication with a global information system, an intranet, or a plurality of intranets.

In some embodiments, the systems and networks include a broadband network implemented by way of a digital subscriber line (DSL), an integrated service digital network (ISDN), a T-1 line, a satellite connection, an EV-DO connection, or a Worldwide Interoperability for Microwave Access (WiMAX) connection, among others. In addition, any combination of wired or wireless communication devices may communicate with the IP network. As used herein, the term "communication device" refers to any combination of software and hardware devices used for sending/receiving any combination of voice, video, and alphanumeric or symbolic text.

According to embodiments of the present disclosure, packet data transmitted over IP network connections is reliably and efficiently vetted prior to being sent outside of the system boundary. Those skilled in the art will realize that the above recognized advantages and other advantages described herein are merely illustrative and are not meant to be a complete rendering of all of the advantages of the various embodiments.

Referring now to the figures, FIG. 1 illustrates a system 100 for implementing a method of vetting data in accordance with some embodiments. As shown, FIG. 1 provides a general depiction of a physical implementation of various embodiments of the present disclosure. Illustratively, system 100 includes a main processor 102 and a secondary processor 104 coupled to the main processor 102 as indicated by an arrow 106. The arrow 106 may represent an interconnection via a system bus. Alternatively, the interconnection illustrated by the arrow 106 between the main processor 102 and the secondary processor 104 can include one or more other hardware and/or software devices useful for enabling inter-processor messaging such as, for example, an inter-processor interrupt. As used herein, the term "processor" includes a microprocessor or central processing unit that executes instructions, codes, computer programs, and scripts which it accesses from a system memory such as, among others, a read-only memory, a random-access memory, a hard disk, a floppy disk, and/or an optical disk and alternatively from locations external to the system via a plurality of network connectivity devices. The plurality of network connectivity devices can comprise, among others, modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. Furthermore, the term "first processor" generally refers to a "primary" or "main" processor such as the main processor 102, while the term "second processor" generally refers to the secondary processor 104. However, such processor designations do not necessarily imply differences in the physical implementation of such processors but rather imply disparate functions as described below in accordance with various embodiments.

As shown, the system 100 further includes an output device 108 that is used to move data outside of the system 100, as indicated by an arrow 124. In particular, data to be output by the system 100 by the output device 108 is temporarily stored in an output data buffer 112 that is coupled to the output device 108. In some embodiments, the output data buffer 112 is integrated within the output device 108. Alternatively, the output data buffer 112 is implemented as a system element external to the output device 108. The output data buffer 112 includes a memory device and can be implemented, for example, as a register, a static random access memory (SRAM), or other well-known memory device. As used herein, the term "output device" includes any combination of devices and/or ports that are used to move data to a location external to the system 100. In some embodiments, the output device includes one or more of the network connectivity devices as described above.

Still referring to FIG. 1 and as indicated by an arrow 110, the main processor 102 receives non-encrypted data or "plaintext". The main processor 102 encrypts the plaintext and generates corresponding ciphertext that is written to the output data buffer 112, as indicated by an arrow 114, while a hardware-implemented buffer access flag 116 is configured in a second setting, as discussed below. The main processor 102 has a read-write permission to the output data buffer 112. However, write access to the output data buffer 112 by the main processor 102 is determined according to the setting of the hardware-implemented buffer access flag 116. For example, when the buffer access flag 116 is configured in a first setting, the main processor 102 is prevented from writing data to the output data buffer 112. Alternatively, when the buffer access flag 116 is configured in the second setting, the main processor 102 is granted access to write data to the output data buffer 112. The buffer access flag 116 includes a hardware-implemented device such as, for example, a processor register bit, a latch, a flip-flop, a bistable multivibrator, or a switch. A "hardware-implemented" flag means that the flag is implemented using dedicated hardware, which is separate and physically distinct from the hardware and/or software used to implement the main processor 102 and the secondary processor 104. This is different from what is described in the prior art. Illustratively, in some embodiments, the first setting of the buffer access flag 116 includes setting an appropriate bit of the buffer access flag 116 to a binary value equal to '1'. Likewise, in some embodiments, the second setting of the buffer access flag 116 includes setting the appropriate bit of the buffer access flag 116 to a binary value equal to '0'.

When the main processor 102 has completed writing the ciphertext to the output data buffer 112, the main processor 102 notifies the secondary processor 104, via the interconnection illustrated by the arrow 106, that there is newly written data in the output data buffer 112. In response to such a notification, the secondary processor 104 sets the buffer access flag 116 to the first setting, as indicated by an arrow 126. Thus, the main processor 102 is prevented from writing additional data to the output data buffer 112 while the data in the output data buffer is being inspected, as discussed below. The secondary processor 104 has read-write access to the buffer access flag 116, while the main processor 102 is granted read-only access to the buffer access flag 116, as indicated by a dashed line 130. Thus, the secondary processor 104 exclusively controls the flow of data between the main processor 102 and the output data buffer 112. Moreover, it should be noted that the secondary processor 104 has a read-only permission to the output data buffer 112, as indicated by a dashed line 132, and cannot modify data written by the main processor 102 to the output data buffer 112. Therefore, while the secondary processor 104 has access to read and inspect the data within the output data buffer 112, the secondary processor 104 does not represent a threat to the integrity of the data within the output data buffer 112.

Once the secondary processor 104 receives the notification that there is newly written data in the output data buffer 112 and the buffer access flag 116 has been set to the first setting, the secondary processor 104 reads and inspects the data within the output data buffer 112. In particular, the secondary processor 104 has access to the plaintext, for example via the interconnection illustrated by the arrow 106, and independently encrypts the plaintext and generates corresponding ciphertext. As indicated by an arrow 118, the secondary processor 104 reads the ciphertext that is stored in the output data buffer 112 or "validation ciphertext", and compares the validation ciphertext to the ciphertext independently generated by the secondary processor 104. The secondary processor 104 thereby confirms that the data in the output data buffer 112 is correctly encrypted and does not contain non-ciphertext data. This procedure prevents the transfer of unauthorized data outside of a boundary of the system 100, thus violating the high-assurance encryption level of the system 100. Where the output data is the plaintext, inspection or verification of the data (vetting the data) by the secondary processor 104 may include, but is not limited to, verifying proper message length, valid opcodes, properly limited data fields, etc., before allowing transfer of the data outside of the system.

If the secondary processor 104 determines that the data stored in the output data buffer 112 contains unauthorized non-ciphertext data or is, in other words, invalid, the secondary processor 104 triggers a system error condition, and the data stored in the output data buffer 112 is not be transferred outside of the system 100. However, if the secondary processor 104 determines that the data stored in the output data buffer 112 contains valid ciphertext data, the secondary processor 104 sets a hardware-implemented transfer flag 120 to a first setting, as indicated by an arrow 128. The transfer flag 120 controls a permission for the output device 108 to transfer the data stored in the output data buffer 112 to a location external to the system 100, in accordance with the setting of the transfer flag 120. For example, when the transfer flag 120 is configured in the first setting, the output device 108 is allowed to transfer the data in the output data buffer 112 to the location external to the system 100. Alternatively, when the transfer flag 120 is configured in a second setting, the output device 108 is prevented from transferring the data in the output data buffer 112 to the location external to the system 100, such as when the data stored in the output data buffer 112 is determined to be invalid. Thus, the secondary processor 104 ensures that the transfer flag 120 remains in the second setting until the data in the output data buffer 112 has been thoroughly vetted and determined to contain valid ciphertext data.

The secondary processor 104 has read-write access to the transfer flag 120, while the main processor 102 is granted read-only access to the transfer flag 120, as indicated by the dashed line 130. Therefore, the secondary processor 104 exclusively controls the flow of data from the output data buffer 112 to locations external to the system 100. The transfer flag 120 includes a hardware-implemented device such as, for example, a processor register bit, a latch, a flip-flop, a bistable multivibrator, or a switch. Illustratively, in some embodiments, the first setting of the transfer flag 120 includes setting an appropriate bit of the transfer flag 120 to a binary value equal to '1'. Likewise, in some embodiments, the second setting of the transfer flag 120 includes setting the appropriate bit of the transfer flag 120 to a binary value equal to '0'.

When the output device 108 completes the transfer of data from the output data buffer 112 to the location external to the system 100, the output device 108 notifies the secondary processor 104 that the transfer is complete. In response to such a notification, the secondary processor 104 sets the transfer flag 120 to the second setting, thus preventing the output device 108 from transferring additional data to the location external to the system 100. Moreover, in response to the notification by the output device 108 that the transfer is complete, the secondary processor 104 sets the buffer access flag 116 to the second setting. Thus, the main processor 102 is allowed to begin writing data once again to the output data buffer 112.

The system 100, as shown in FIG. 1, further includes a hardware-implemented rights enforcement device 122 coupled to each of the main processor 102 and the secondary processor 104. The rights enforcement device 122 includes a dedicated, independent hardware device that performs a hardware-based enforcement of the "read-only" and "read-write"

permissions of the main and secondary processors 102, 104, as related to each of the output data buffer 112, the buffer access flag 116, and the transfer flag 120, as discussed above. In some embodiments, the rights enforcement device 122 includes a "bus monitor".

Figure 2:
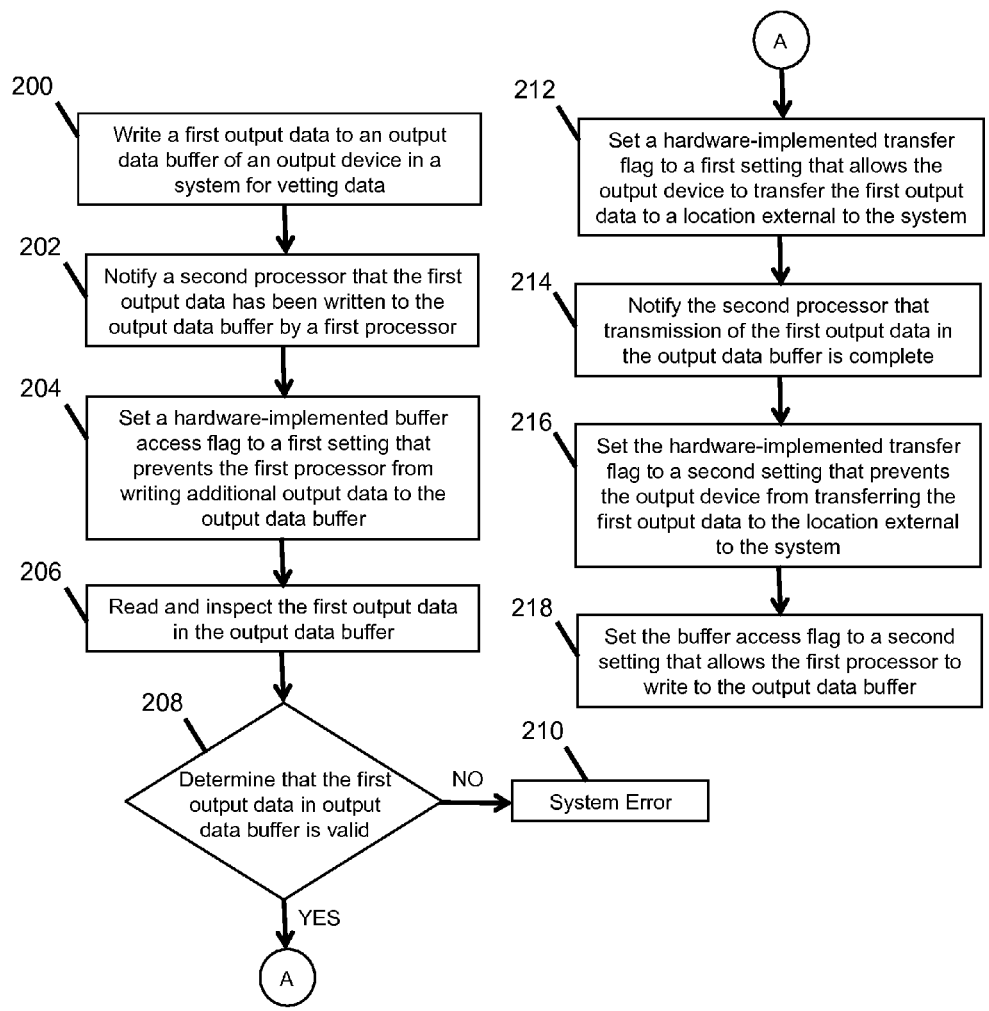
FIG. 2 is a logical flowchart showing an illustrative method for vetting data in accordance with some embodiments.

FIG. 2 shows a logical flowchart illustrating a method for vetting data in accordance with some embodiments. Accordingly, the method includes writing output data to an output data buffer (200). A first processor writes the output data, where write access to the output data buffer by the first processor is granted according to a hardware-implemented buffer access flag configured in a second setting. In some embodiments, the output data includes ciphertext. Alternatively, in other embodiments, the output data includes non-encrypted data or "plaintext". The method notifies a second processor that the first processor has written data to the output data buffer (202). Responsive to such a notification, the second processor sets the buffer access flag to a first setting (204). The first setting prevents the first processor from writing additional data to the output data buffer while the data in the output buffer is being validated.

The second processor has read-write access to the buffer access flag and the first processor is has read-only access to the buffer access flag. Additionally, the second processor has a read-only permission to the output data buffer and cannot modify data that has been written by the first processor to the output data buffer.

Still referring to FIG. 2, the second processor reads and inspects the data within the output data buffer (206) while the buffer access flag remains set to the first setting. If the second processor determines that the data stored in the output data buffer contains invalid data at 208, the second processor triggers an error condition (210), and the data in the output data buffer is not transferred to a location external to the system. Alternatively, if the second processor determines that the data stored in the output data buffer contains valid data at 208, the second processor sets a hardware-implemented transfer flag to a first setting (212). The transfer flag controls a permission for the output device to transfer the data stored in the output data buffer to the location external to the system. Specifically, when the transfer flag is configured in the first setting, the output device is allowed to transfer the data in the output data buffer to the location external to the system. Optionally, when the transfer flag is configured in a second setting, the output device is prevented from transferring the data in the output data buffer to the location external to the system. The second processor has read-write access to the transfer flag, while the first processor has read-only access to the transfer flag.

Upon completion of the transfer of data from the output data buffer to the location external to the system, the output device notifies the second processor that the transfer is complete (214). The second processor sets the transfer flag to the second setting (216). This prevents the output device from transferring any further data to the location external to the system. In addition, the second processor sets the buffer access flag to the second setting (218). Thus, the first processor is once again allowed to write data to the output data buffer.

Figure 3:
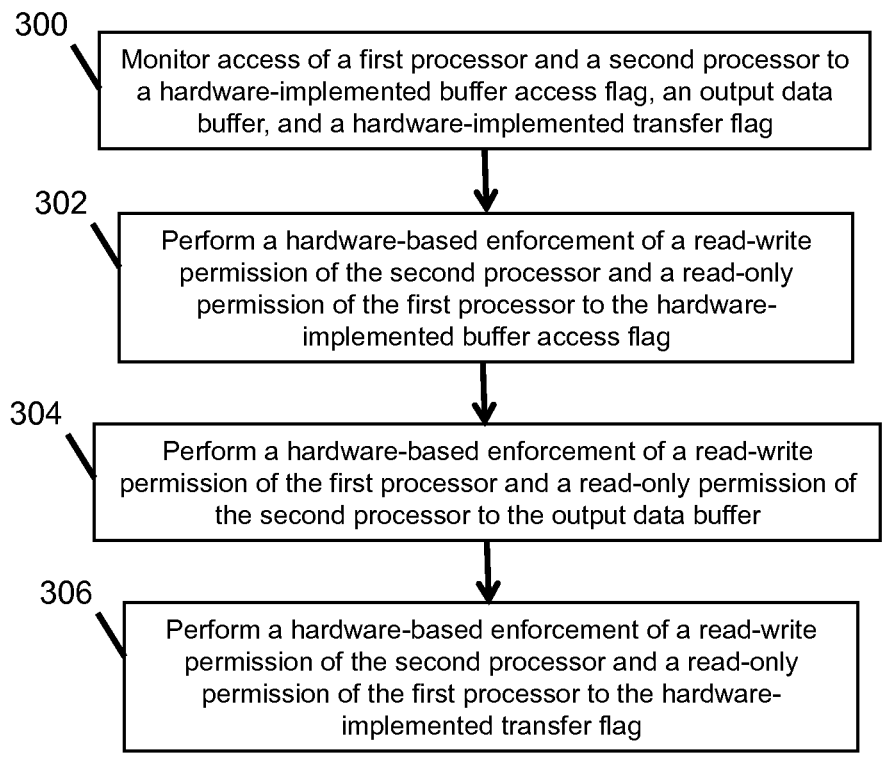
FIG. 3 is a logical flowchart showing an illustrative method for managing access rights in accordance with some embodiments.

FIG. 3 shows a logical flowchart illustrating a method for managing access rights in accordance with some embodiments. The method includes monitoring access of each of a first processor and a second processor to each of an output data buffer, a hardware-implemented buffer access flag, and a hardware-implemented transfer flag (300). Data to be output by an output device of a system is temporarily stored in an output data buffer, where the output data buffer is coupled to the output device. The buffer access flag controls a permission for the first processor to write data to the output data buffer, and the transfer flag controls a permission for the output device to transfer data within the output data buffer to a location external to the system. Permissions granted and/or denied to the first and second processors for each of the output data buffer, the buffer access flag, and the transfer flag are enforced by a dedicated, hardware-implemented rights enforcement device that is physically independent from but electrically coupled to each of the first and second processors.

Specifically, the rights enforcement device performs a hardware-based enforcement of a read-write permission of the second processor and a read-only permission of the first processor to the buffer access flag (302). In addition, the rights enforcement device performs a hardware-based enforcement of a read-write permission of the first processor and a read-only permission of the second processor to the output data buffer (304). Moreover, the rights enforcement device performs a hardware-based enforcement of a read-write permission of the second processor and a read-only permission of the first processor to the transfer flag (306). The "hardware-based enforcement" of permissions means monitoring and enforcing permissions of one or more processors using dedicated hardware that is separate and physically distinct from the hardware and/or software used to implement the processor(s) being monitored.

In one illustrative implementation, the hardware rights-enforcement device has dedicated hardware that maintains a list of access rights or permissions for the main and secondary processors. When a processor tries to access a register or a memory, the hardware rights-enforcement device compares that request against the known list and grants or denies access accordingly. This dedicated hardware approach is different from prior art systems and provides true independence between the monitoring device and the thing being monitored, which provides for a fail-safe design and guards against a single point of failure compromising the system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for vetting data in a system including a first processor, a second processor, and an output device, the method comprising:
at the second processor:
receiving a notification that the first processor has written output data to an output data buffer in the output device;
setting a hardware-implemented buffer access flag to a first setting, wherein the hardware-implemented buffer access flag prevents the first processor to write data to the output data buffer;
inspecting the output data written by the first processor to confirm that the output data written by the first processor is correctly encrypted, does not contain non-ciphertext data, or is valid, and wherein the first setting prevents the first processor from writing additional output data to the output data buffer while the output data in the output data buffer is being inspected;
setting a hardware-implemented transfer flag to a first setting that grants permission to an output device to transfer the output data when the output data written by the first processor is correctly encrypted, does not contain non-ciphertext data, or is valid;
setting the hardware implemented transfer flag to a second setting that denies permission to the output device to transfer the output data when the output data written by the first processor is not correctly encrypted, contain non-ciphertext data, or is invalid;
wherein the second processor has a permission to set the hardware-implemented buffer access flag, and wherein the first processor has a read-only permission to the hardware-implemented buffer access flag.

2. The method of claim 1, wherein the output data comprises ciphertext.

3. The method of claim 1,
wherein the second processor has a permission to set the hardware-implemented transfer flag, and wherein the first processor has a read-only permission to the hardware-implemented transfer flag.

4. The method of claim 3 further comprising:
receiving a notification that transmission of the output data to the location external to the system is complete; and
setting the hardware-implemented buffer access flag to a second setting that grants the permission to the first processor to write data to the output data buffer.

5. The method of claim 1 wherein the step of inspecting the output data written by the first processor comprises the steps of:
encrypting data by the second processor; and
comparing the encrypted data to the output data from the first processor.

6. A method for managing access rights in a system including a first processor, a second processor, and an output device, the method comprising:
at a rights enforcement device coupled to the first processor and the second processor:
monitoring access of the first processor and the second processor to a hardware-implemented buffer access flag that grants access to the first processor to write data to an output data buffer in the output device;
performing a hardware-based enforcement of a read-write permission of the second processor to the hardware-implemented buffer access flag, wherein the second processor inspects the data written by the first processor to confirm that the data written by the first processor is correctly encrypted, does not contain non-ciphertext data, or is valid; and performing a hardware-based enforcement of a read-only permission of the first processor to the hardware-implemented buffer access flag.

7. The method of claim 6 further comprising:
monitoring access of the first processor and the second processor to the output data buffer;
performing a hardware-based enforcement of a read-write permission of the first processor to the output data buffer based on a setting, by the second processor, of the hardware-implemented buffer access flag; and
performing a hardware-based enforcement of a read-only permission of the second processor to the output data buffer.

8. The method of claim 6 further comprising:
monitoring access of the first processor and the second processor to a hardware-implemented transfer flag that controls a transfer, by the output device to a location external to the system, of data written to the output data buffer;
performing a hardware-based enforcement of a read-write permission of the second processor to the hardware-implemented transfer flag; and
performing a hardware-based enforcement of a read-only permission of the first processor to the hardware-implemented transfer flag.

9. A system for vetting data comprising:
an output device including an output data buffer;
a first processor and a second processor coupled to the output data buffer, wherein the first processor writes output data to the output data buffer and notifies the second processor that the output data has been written to the output data buffer; and
a hardware-implemented buffer access flag coupled to the first and second processors and to the output device, wherein the hardware-implemented buffer access flag grants access to the first processor to write the output data to the output data buffer, wherein the second processor has a permission to set the hardware-implemented buffer access flag and the first processor has a read-only permission to the hardware-implemented buffer access flag, and
wherein the second processor inspects the output data written by the first processor to confirm that the output data written by the first processor is correctly encrypted, does not contain non-ciphertext data, or is valid, and wherein the second processor sets a hardware-implemented transfer flag to a first setting that grants permission to the output device to transfer the output data when the output data written by the first processor is correctly encrypted, does not contain non-ciphertext data, or is valid, and sets the hardware implemented transfer flaq to a second setting that denies permission to the output device to transfer the output data when the output data written by the first processor is not correctly encrypted, contain non-ciphertext data, or is invalid.

10. The system of claim 9, wherein the output data comprises encrypted data.

11. The system of claim 9, wherein the first processor has a read-write permission to the output data buffer and the second processor has a read-only permission to the output data buffer.

12. The system of claim 9 further comprising:
a hardware-implemented rights enforcement device coupled to the first processor and the second processor, wherein the hardware-implemented rights enforcement device performs a hardware-based enforcement of a read-write permission of the second processor and a read-only permission of the first processor to the hardware-implemented buffer access flag.

13. The system of claim 9 further comprising:
a hardware-implemented rights enforcement device coupled to the first processor and the second processor, wherein the hardware-implemented rights enforcement device performs a hardware-based enforcement of a read-write permission of the first processor to the output data buffer based on a setting, by the second processor, of the hardware-implemented buffer access flag and a read-only permission of the second processor to the output data buffer.

14. The system of claim 9 further comprising:
a hardware-implemented transfer flag coupled to the first and second processors and to the output device, wherein the hardware-implemented transfer flag controls a permission for the output device to transfer the output data to a location external to the system, wherein the second processor has a permission to set the hardware-implemented transfer flag, and wherein the first processor has a read-only permission to the hardware-implemented transfer flag.

15. The system of claim 14 further comprising:
a hardware-implemented rights enforcement device coupled to the first processor and the second processor, wherein the hardware-implemented rights enforcement device performs a hardware-based enforcement of a read-write permission of the second processor and a read-only permission of the first processor to the hardware-implemented transfer flag.

* * * * *